US006977445B2

(12) United States Patent
Lubomirsky

(10) Patent No.: US 6,977,445 B2
(45) **Date of Patent: *Dec. 20, 2005**

(54) THREE PHASE RECTIFIER CIRCUIT WITH VIRTUAL NEUTRAL

(75) Inventor: Vadim Lubomirsky, Rochester, NY (US)

(73) Assignee: ENI Technology, Inc., Rochester, NY (US)

(*) Notice: Subject to any disclaimer, the term of this patent is extended or adjusted under 35 U.S.C. 154(b) by 91 days.

This patent is subject to a terminal disclaimer.

(21) Appl. No.: 10/331,774

(22) Filed: Dec. 30, 2002

(65) Prior Publication Data

US 2003/0151935 A1 Aug. 14, 2003

Related U.S. Application Data

(63) Continuation of application No. 09/993,276, filed on Nov. 16, 2001, now Pat. No. 6,501,192.

(51) Int. Cl.[7] .......... H02J 1/10
(52) U.S. Cl. .......... 307/18
(58) Field of Search .......... 307/18, 24; 363/67–69

(56) References Cited

U.S. PATENT DOCUMENTS 4,023,071 A * 5/1977 Fussell .......... 361/56
5,124,904 A 6/1992 Paice
5,406,470 A 4/1995 Ridley et al.
5,984,173 A * 11/1999 Edwards .......... 323/207
6,473,284 B1 * 10/2002 Ilic et al. .......... 361/91.1
6,501,192 B1 * 12/2002 Lubomirsky .......... 307/18
6,650,523 B1 * 11/2003 Kleemeier et al. .......... 361/93.6

* cited by examiner

*Primary Examiner*—Gary L Laxton
(74) *Attorney, Agent, or Firm*—Harness, Dickey & Pierce, P.L.C.

(57) ABSTRACT

A rectifier circuit powers three power conversion modules using a three phase AC input without a neutral connection. The rectifier circuit includes a first bridge rectifier that is connected to a first phase of the three phase AC input and that produces a first rectified waveform. A second bridge rectifier is connected to a second phase of the three phase AC input and produces a second rectified waveform. A third bridge rectifier is connected to a third phase of the three phase AC input and produces a third rectified waveform. A first inductor has one end that is connected to the first bridge rectifier. A second inductor has one end that is connected to the second bridge rectifier. A third inductor has one end that is connected to the third bridge rectifier. Opposite ends of the first, second and third inductors are connected to form a virtual neutral. A protection circuit prevents overvoltage when one of the DC outputs is shorted.

14 Claims, 11 Drawing Sheets

THREE PHASE RECTIFIER CIRCUIT WITH VIRTUAL NEUTRAL

FIELD OF THE INVENTION

The present invention relates to rectifier circuits, and more particularly to rectifier circuits that rectify three phase AC power sources without a neutral connection.

BACKGROUND OF THE INVENTION

Rectifier circuits are commonly used for converting an alternating current (AC) signal into a direct current (DC) signal. Applications that require either DC power or AC power at a different frequency initially require the 50–60 Hz three phase AC power to be rectified. The rectified DC power can then be used or processed using power conversion modules.

Some applications require DC power at a higher or lower level than the rectified DC voltage. In this situation, a power conversion module converts the DC power to the desired higher or lower DC level. When AC power at a different frequency or voltage is desired, the rectified DC power is inverted by a power conversion module to AC at the desired voltage or frequency.

In some situations, it is desirable to run a DC-AC power conversion module without using a regulated DC power supply. Certain types of power conversion modules (especially 1 MHz and up) become significantly less efficient as their DC supply voltage is increased.

There are many applications for power conversion modules that are supplied by 400VAC (common in foreign countries) or 480VAC (common in the United States) mains. These applications include RF amplifiers and RF generators. The standard practice for high frequency power conversion modules is to connect two or more lower voltage power conversion modules in series. However, if one of the series connected modules fails during operation, the whole system fails. It is also difficult to share the rectified DC input voltage evenly between the series connected power conversion modules.

When the AC supply is three phase, three AC signals and a ground and/or neutral are typically provided. When the neutral is available, the voltages that are delivered to the circuit can be phase-to-phase or phase-to-neutral. In many facilities, however, the neutral connection is not available. When no neutral connection is available, the voltages that are delivered to the circuit can be only phase-to-phase. The phase-to-neutral voltages are typically lower than the phase-to-phase voltages by a factor that is equal to $\sqrt{3}$. The lower voltages allow higher efficiency in DC-AC high frequency applications and a phase-to-neutral connection would be utilized if availability of the neutral connection was guaranteed. Also, there are current restrictions for the neutral wires, and any application which utilizes a neutral connection provided by their facility is subject to those restrictions.

SUMMARY OF THE INVENTION

A rectifier circuit according to the present invention powers three power conversion modules using a three phase AC input without a neutral connection. The rectifier circuit includes a first bridge rectifier that is connected to a first phase of the three phase AC input and that produces a first rectified waveform. A second bridge rectifier is connected to a second phase of the three phase AC input and produces a second rectified waveform. A third bridge rectifier is connected to a third phase of the three phase AC input and produces a third rectified waveform. A first inductor has one end that is connected to the first bridge rectifier. A second inductor has one end that is connected to the second bridge rectifier. A third inductor has one end that is connected to the third bridge rectifier. Opposite ends of the first, second and third inductors are connected to form a virtual neutral.

A first capacitor that is connected across the first bridge rectifier filters the first rectified waveform and creates a first DC rail voltage. A second capacitor that is connected across the second bridge rectifier filters the second rectified waveform and creates a second DC rail voltage. A third capacitor that is connected across the third bridge rectifier filters the third rectified waveform and creates a third DC rail voltage.

The first DC rail voltage feeds a first power conversion module. The second DC rail voltage feeds a second power conversion module. The third DC rail voltage feeds a third power conversion module. Two of the first, second, and third power conversion modules remain powered at a decreased voltage level when the remaining one of the first, second, and third power conversion modules fails.

The first, second, and third bridge rectifiers include first, second, third, and fourth diodes, each with an anode and a cathode. The anode of the first diode is connected to the cathode of the second diode. The cathode of the first diode is connected to the cathode of the third diode. The anode of the second diode is connected to the anode of the fourth diode. The anode of the third diode is connected to the cathode of the fourth diode. The anode of the first diode of the first bridge rectifier is connected to the first phase of the three phase AC input. The anode of the first diode of the second bridge rectifier is connected to the second phase of the three phase AC input. The anode of the first diode of the third bridge rectifier is connected to the third phase of the three phase AC input.

The first inductor is connected to the anode of the third diode of the first bridge rectifier. The second inductor is connected to the anode of the third diode of the second bridge rectifier. The third inductor is connected to the anode of the third diode of the third bridge rectifier.

A first resistor is connected across the first bridge rectifier. A second resistor is connected across the second bridge rectifier. A third resistor is connected across the third bridge rectifier.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
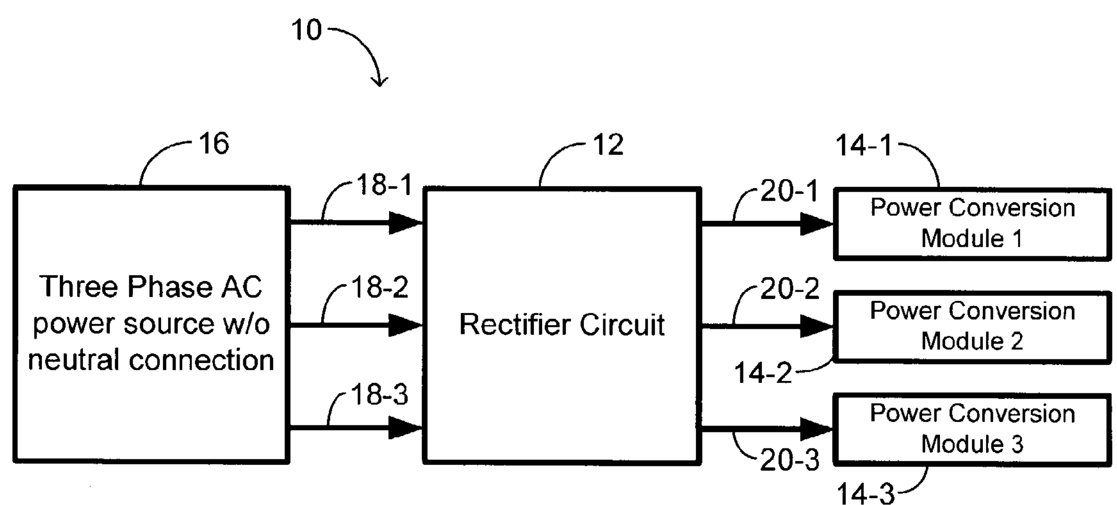
FIG. 1 is a functional block diagram illustrating a rectifier circuit that is connected to three power conversion modules and a three phase AC power source without a neutral connection according to the present invention.

The following description of the preferred embodiments is merely exemplary in nature and is in no way intended to limit the invention, its application, or uses. For purposes of clarity, the same reference numbers will be used in the drawings to identify similar elements.

Referring now to FIG. 1, a power conversion circuit 10 includes a rectifier circuit 12 that powers three power conversion modules 14-1, 14-2 and 14-3. A three phase AC power source 16 without a neutral connection is connected to the rectifier circuit 12. The three phase AC power source 16 outputs three AC sinusoidal output voltages 18-1, 18-2 and 18-3. The rectifier circuit 12 converts the AC sinusoidal voltages into DC rail output voltages 20-1, 20-2 and 20-3 that are output to three power conversion modules 14-1, 14-2 and 14-3.

Figure 2:
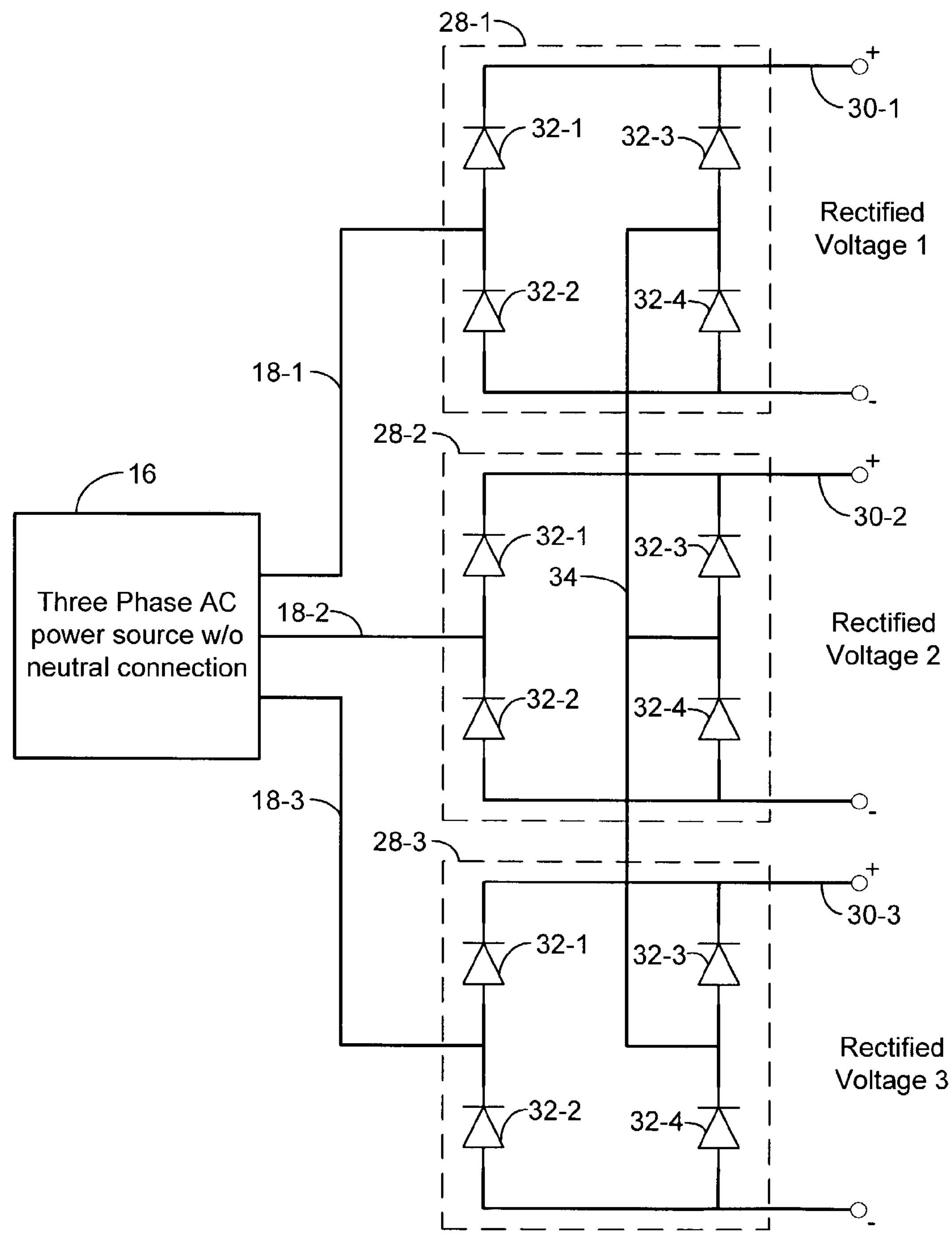
FIG. 2 is a schematic showing three bridge rectifiers that convert the three phase AC power source without a neutral connection into three rectified waveforms.

Referring now to FIG. 2, the bridge rectifiers 28-1, 28-2 and 28-3 are connected to the phases of the three phase AC power source 16. The phases of the three phase AC power source 16 produce AC sinusoidal output voltages 18-1, 18-2 and 18-3. The bridge rectifiers 28-1, 28-2 and 28-3 rectify the AC sinusoidal output voltages 18-1, 18-2 and 18-3 and produce rectified output voltages 30-1, 30-2 and 30-3. The bridge rectifiers 28-1, 28-2 and 28-3 invert the negative portions of the AC sinusoidal output voltages 18-1, 18-2 and 18-3. This is accomplished by the specific arrangement of the diodes 32 that make up the bridge rectifiers 28-1, 28-2 and 28-3.

The bridge rectifiers 28-1, 28-2 and 28-3 are comprised of four diodes 32-1, 32-2, 32-3 and 32-4, each having an anode and a cathode. The anode of the first diode 32-1 is connected to the cathode of the second diode 32-2. The cathode of the first diode 32-1 is connected to the cathode of the third diode 32-3. The anode of the second diode 32-2 is connected to the anode of the fourth diode 32-4. The anode of the third diode 32-3 is connected to the cathode of the fourth diode 32-4.

Additionally, the anode of the first diode 32-1 of the bridge rectifiers 28-1, 28-2 and 28-3 is connected to one output voltage 18-1, 18-2 and 18-3, respectively, of the three phase AC power source 16. A connection 34 is made between the bridge rectifiers 28-1, 28-2 and 28-3 that forms a virtual neutral. The virtual neutral connection 34 includes a conductor that connects the anode of the third diode 32-3 of the three bridge rectifiers 28-1, 28-2 and 28-3.

Figure 3:
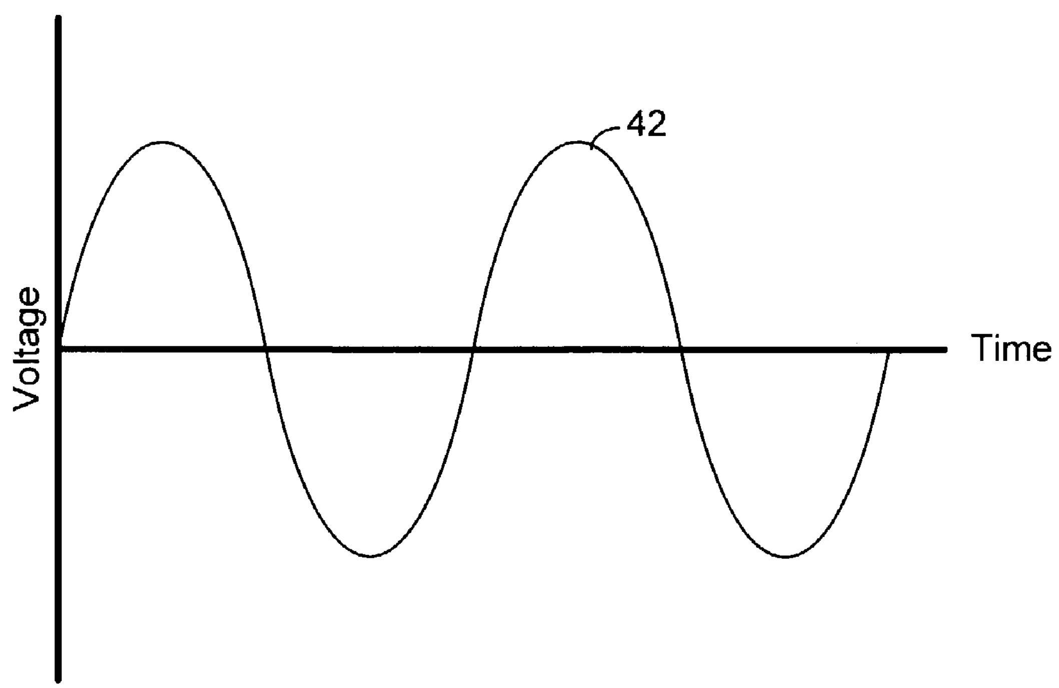
FIG. 3 illustrates a waveform that is produced by the three phases of the three phase AC power source.
Figure 4:
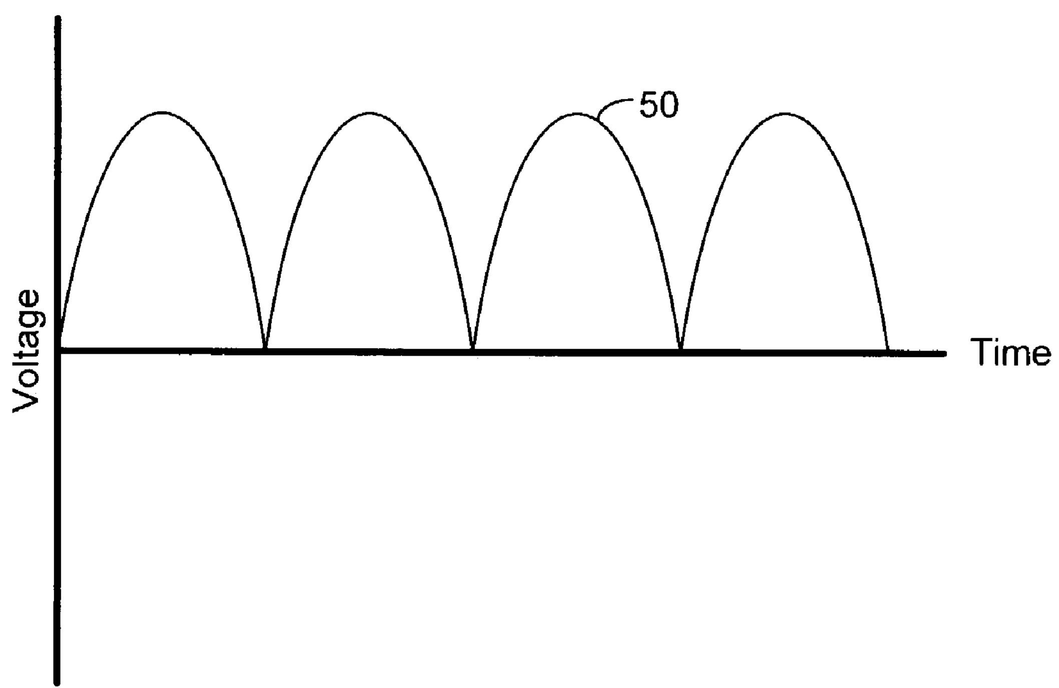
FIG. 4 illustrates a waveform that is produced by the three bridge rectifiers.

FIG. 3 illustrates an exemplary waveform 42 that is produced by the phases of the three phase AC power source 16. The waveforms of each phase are offset by 120° from each other. FIG. 4 illustrates an exemplary waveform 50 that is produced by the bridge rectifiers 28-1, 28-2 and 28-3. As previously discussed above, the diodes 32 rectify the waveform 42 of the AC sinusoidal voltages 18-1, 18-2 and 18-3 that are shown in FIG. 3.

Figure 5:
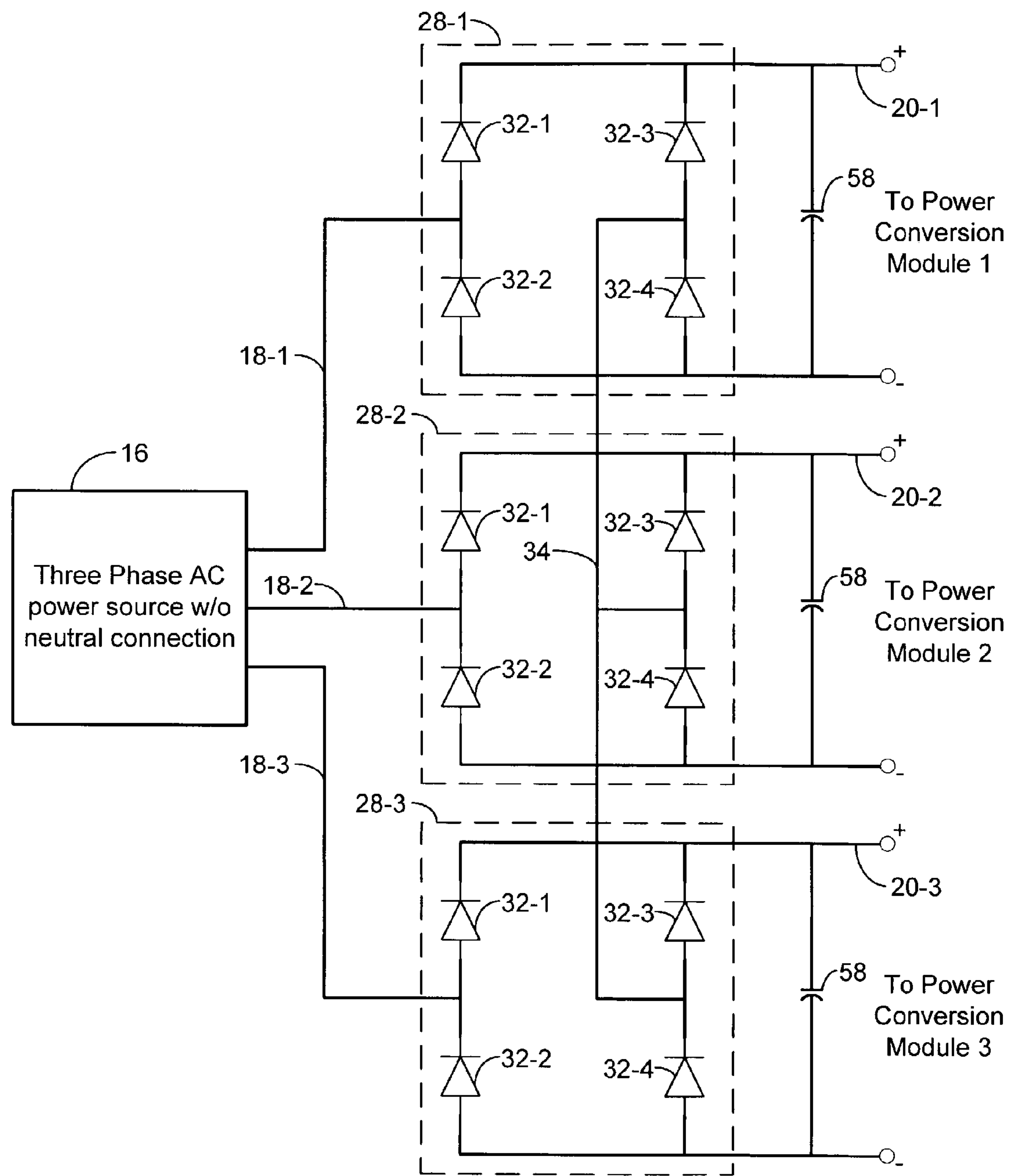
FIG. 5 is a schematic showing bridge rectifiers and capacitors that convert the three phase AC power source without a neutral connection into three DC rail voltages.

Referring now to FIG. 5, capacitors 58 are preferably used to smooth the rectified voltage. For purposes of clarity, reference numbers from FIG. 2 are used in FIG. 5 to identify similar elements. The bridge rectifiers 28-1, 28-2 and 28-3 and capacitors 58 convert the AC sinusoidal output voltages 18-1, 18-2 and 18-3 from the three phase AC power source 16 into DC rail output voltages 20-1, 20-2 and 20-3. The capacitors 58 filter the rectified voltages 30-1, 30-2 and 30-3 by smoothing the voltage peaks that are shown on the waveform 50 of FIG. 4. The result is an approximately constant output voltage. The DC rail output voltages 20-1, 20-2 and 20-3 of the rectifier circuit 12 are of substantially equal magnitude. Additionally, the DC rail output voltages 20-1, 202 and 20-3 feed power conversion modules 14-1, 14-2 and 14-3. If any one of the three power conversion modules 14-1, 14-2 and 14-3 fail during operation, the remaining two power conversion modules 14-1, 14-2 and 14-3 will remain powered at a decreased voltage level.

Figure 6:
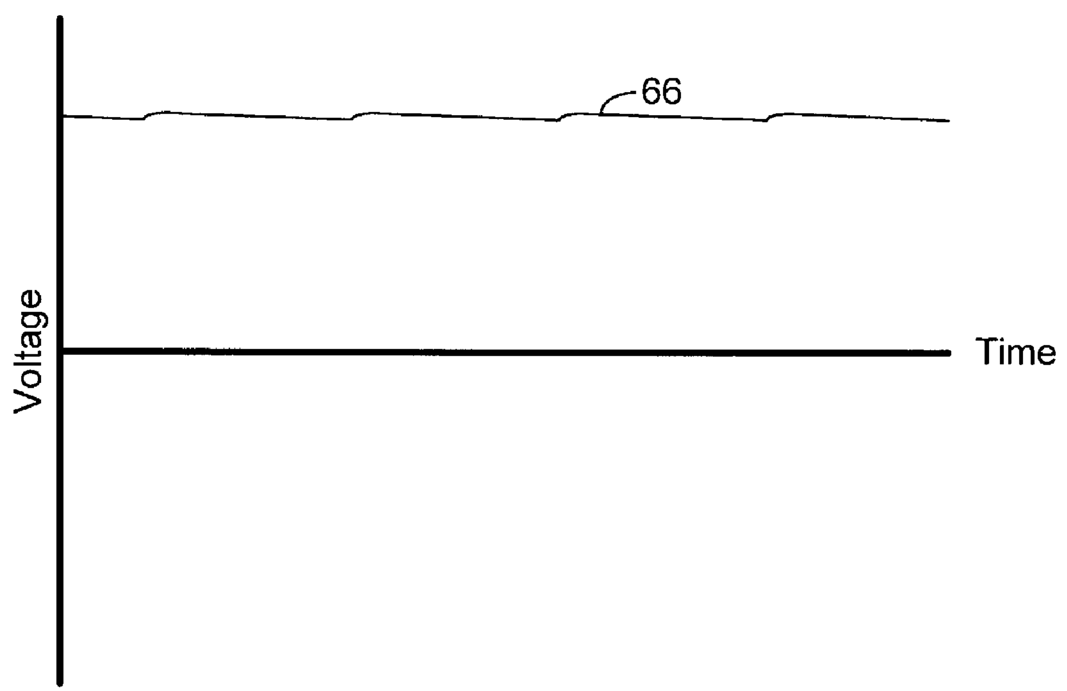
FIG. 6 illustrates the waveform that is produced by the three capacitors of FIG. 5.

FIG. 6 illustrates the waveform 66 that is produced by the capacitors 58. A plot of the DC rail voltages 20-1, 20-2 and 20-3 as a function of time is shown. As discussed above, the capacitors 58 filter the rectified output voltages 30-1, 30-2 and 30-3 from the bridge rectifiers 28-1, 28-2 and 28-3 by smoothing the peak voltages of the waveform 50 of FIG. 4.

Figure 7:
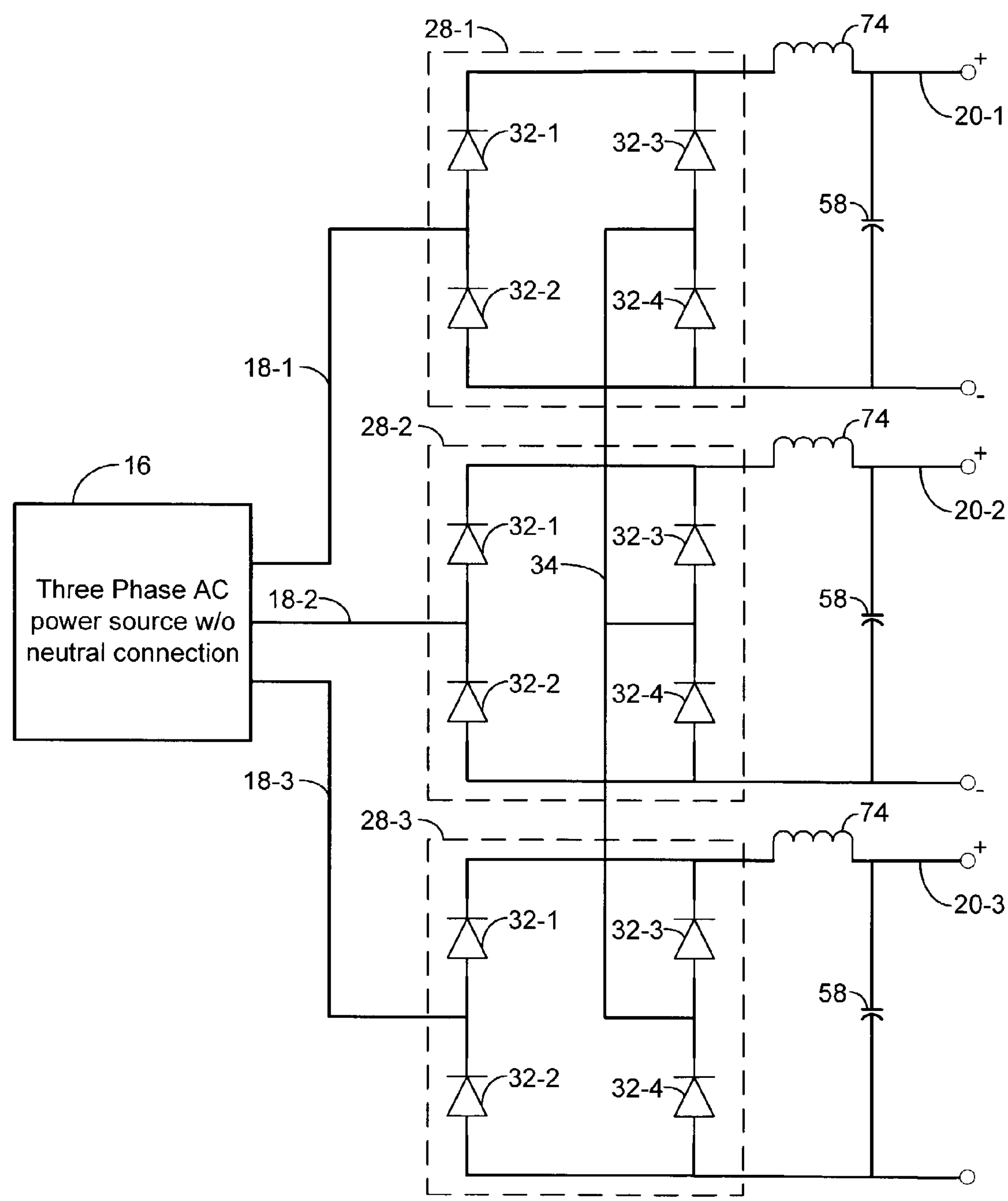
FIG. 7 is a schematic showing an inductor between the bridge rectifiers and the capacitors.

Referring now to FIG. 7, inductors 74 can be optionally located between the bridge rectifiers 28-1, 28-2 and 28-3 and the capacitors 58 to further smooth the DC rail voltages 20-1, 20-2 and 20-3 that are produced by the capacitors 58. The inductors 74 decrease the ripples in the DC rail voltages 20-1, 20-2 and 20-3 that are produced by the capacitors 58 and that are shown in FIG. 6. Additionally, the inductors 74 increase the power factor.

Figure 8:
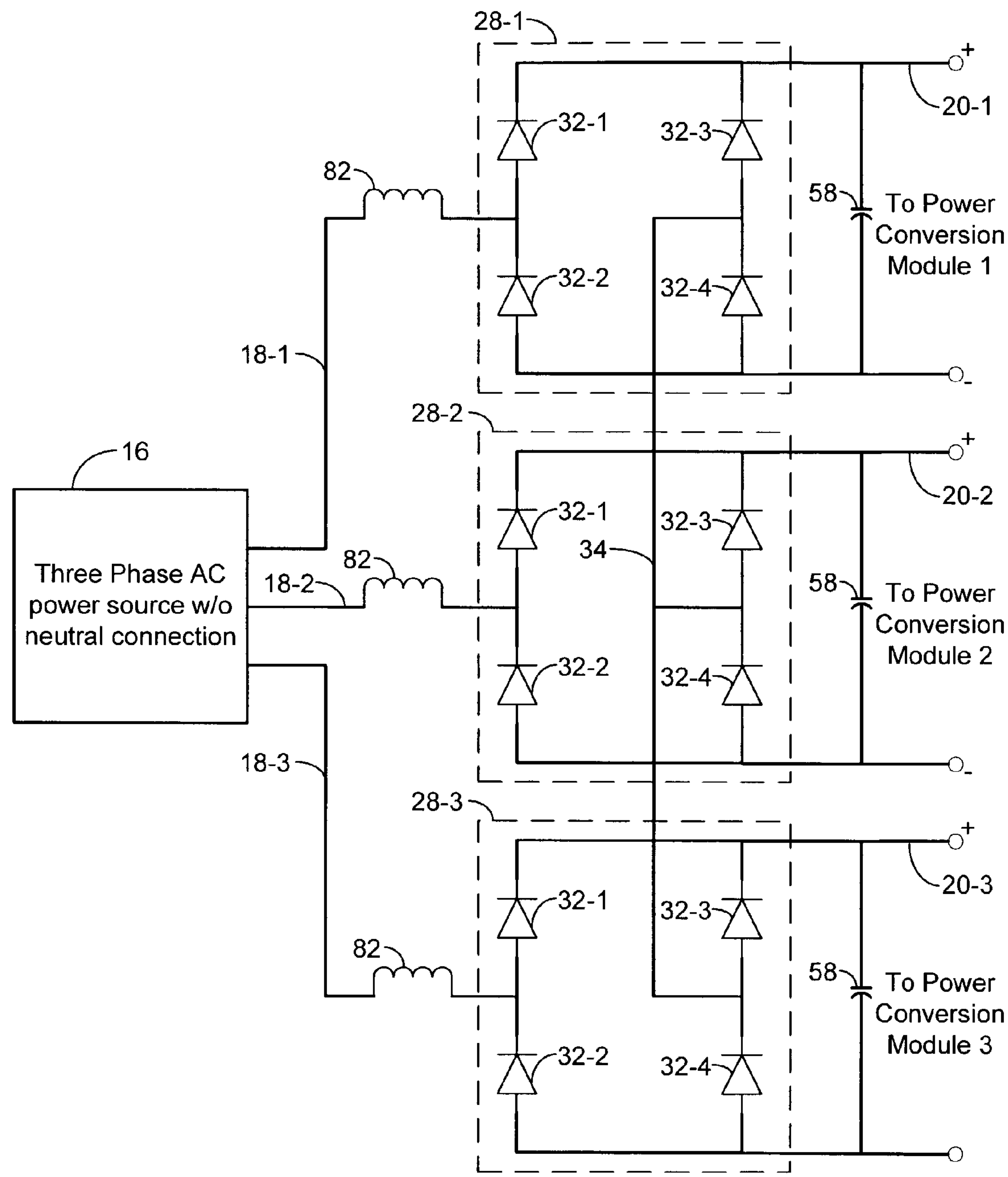
FIG. 8 is a schematic showing an inductor between the phases of the three phase AC power source and the bridge rectifiers.

In FIG. 8, inductors 82 between the phases of the three phase AC power source 16 and the bridge rectifiers 28-1, 28-2 and 28-3 smooth the DC rail voltages 20-1, 20-2 and 20-3 that are filtered by the capacitors 58. The inductors 82 perform a similar function to the inductors 74 of the schematic in FIG. 7. The inductors 82 decrease the ripples in the DC rail output voltages 20-1, 20-2 and 20-3 that are produced by the capacitors 58 and increase the power factor of the rectifier circuit.

Figure 9:
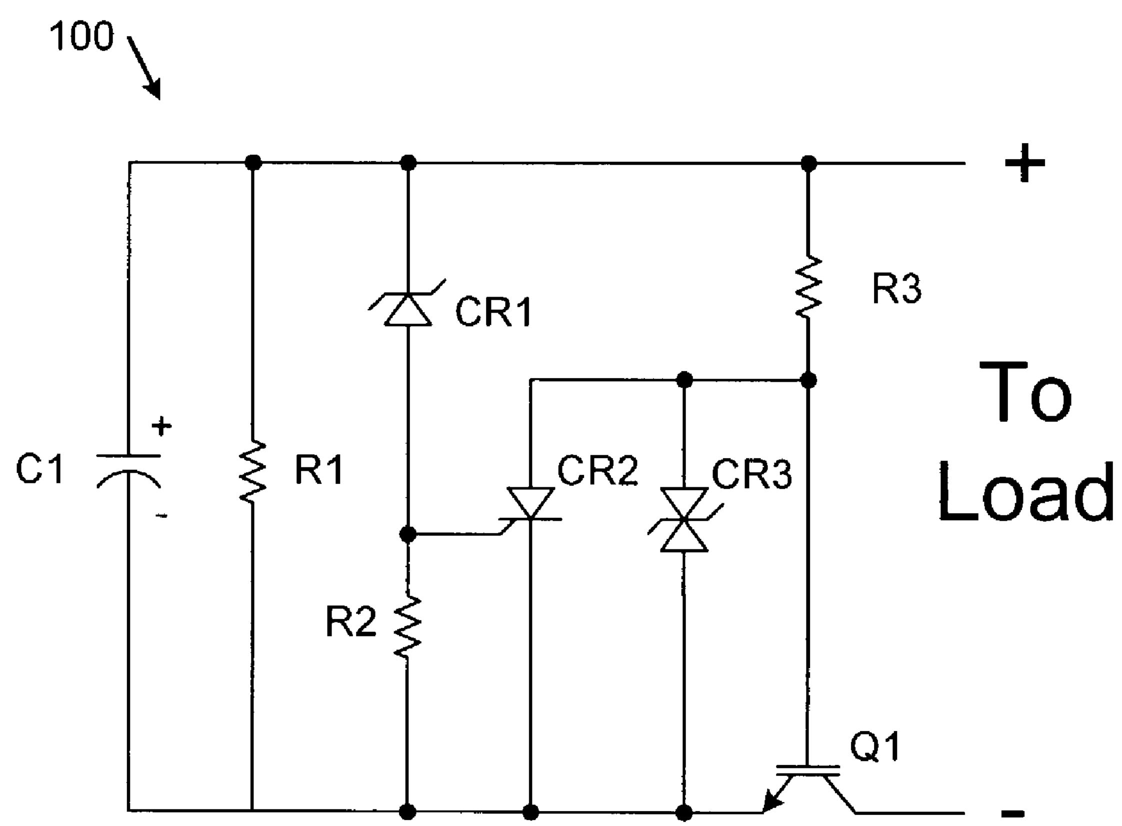
FIG. 9 is a schematic illustrating an overvoltage protection circuit according to the present invention.

Referring now to FIG. 9, when one of the three DC outputs is shorted, the other two DC output voltages will increase. An overvoltage protection circuit 100 according to the present invention is used to protect the loads from overvoltage. The overvoltage protection circuit 100 includes a capacitor C1 that is connected in parallel with a resistor R1. One end of the resistor R1 is connected to a cathode of a zener diode CR1. An opposite end of the zener diode CR1 is connected to one end of a resistor R2 and a gate of a silicon controlled rectifier (SCR) CR2. An opposite end of the resistor R2 is connected to an opposite end of the resistor R1 and a cathode of the zener diode CR2. An anode of the zener diode CR2 is connected to one end of a transzorb CR3. An opposite end of the transzorb CR3 is connected to the cathode of CR2 and to an emitter of a transistor Q1. In a preferred embodiment, the transistor Q1 is an insulated gate bipolar transistor (IGBT).

A gate of the transistor Q1 is connected to one end of a third resistor R3, to the one end of the transzorb CR3, and to the anode of the zener diode CR2. An opposite end of the resistor R3 is connected to the cathode of the zener diode CR1, the one end of the resistor R1, to one end of the capacitor C1, and to a positive terminal of the load. A collector of the transistor Q1 is connected to a negative terminal of the load.

In use, the capacitor C1 and the resistor R1 are the capacitor bank and bleeder resistor, which are located at the output of each of the three virtual neutral DC outputs. When the voltage across the capacitor C1 exceeds the voltage rating of the zener diode CR1, the zener diode CR1 begins to conduct current. A voltage drop is developed across the resistor R2. The gate of the SCR CR2 is biased and the SCR CR2 is triggered to an on state. The gate of the transistor Q1 is clamped to its emitter by the SCR CR2 and the transistor Q1 turns off, which protects the load. The resistor R3 provides a gate bias for the transistor Q1 during normal operation and the transzorb CR3 limits the gate-source voltage to a safe level.

Figure 10:
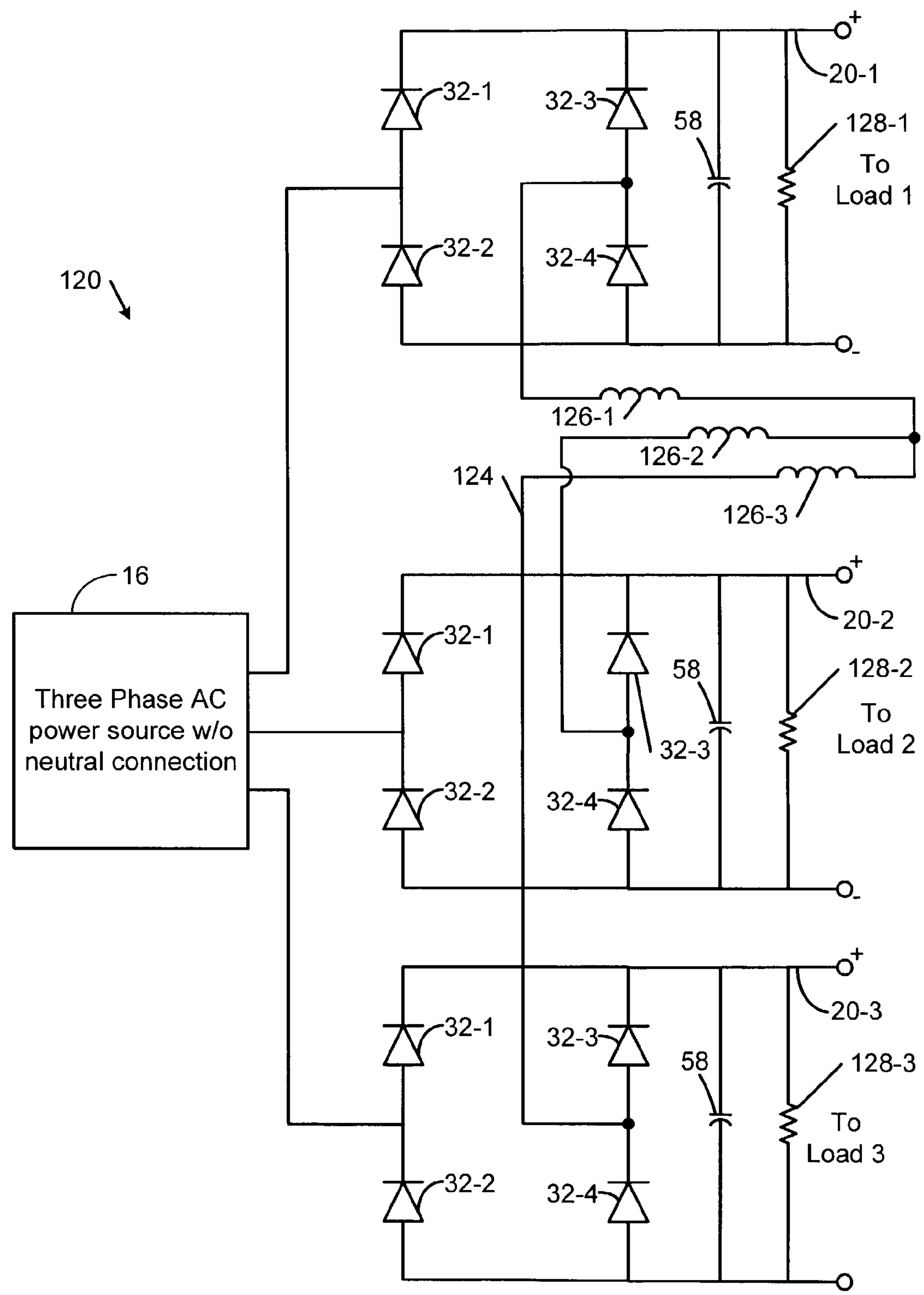
FIG. 10 is a schematic illustrating an alternate embodiment with inductors branching out from a virtual neutral.

Referring now to FIG. 10, an alternate method for forming a virtual neutral and connecting inductors is shown. The circuit 120 includes a virtual neutral 124 and inductors 126-1, 126-2 and 126-3 (collectively referred to as 126). Capacitors 58-1, 58-2 and 58-3 and resistors 128-1, 128-2, and 128-3 are connected across the load. The inductors 126 branch out from the virtual neutral and provide power factor correction. In addition, the inductors 126 reduce shifting of the virtual neutral point when the three loads are not equal. In other words, the DC output voltages are closer to each other even when different current levels are supplied to the three loads.

Figure 11:
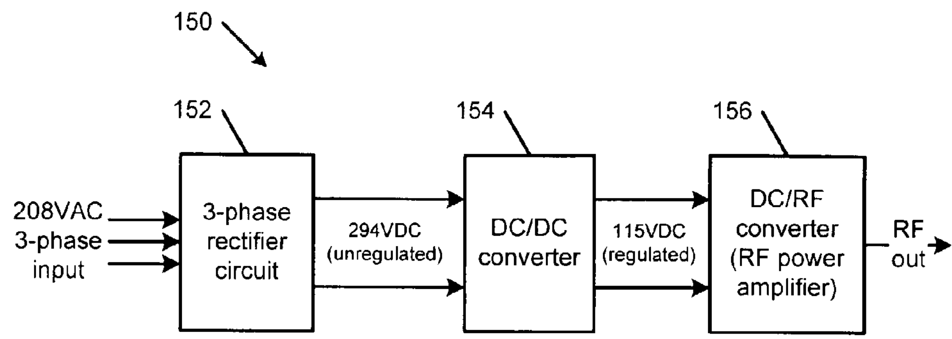
FIG. 11 is a functional block diagram of a radio frequency (RF) amplifier according to the prior art.
Figure 12:
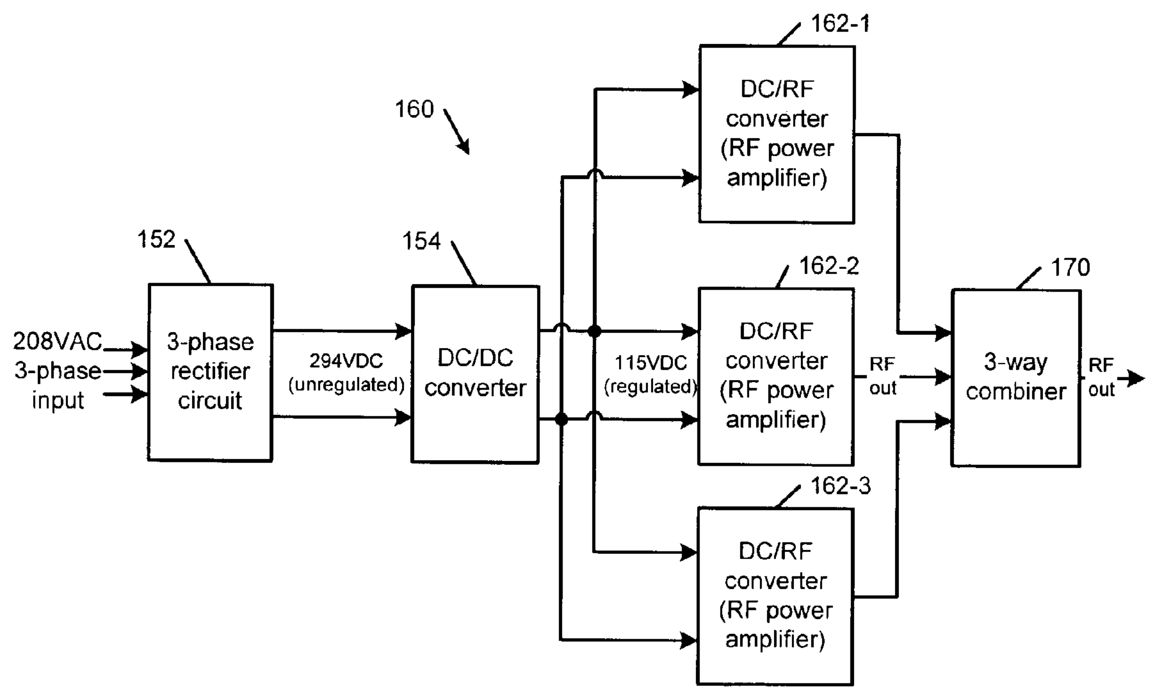
FIG. 12 is a functional block diagram of multiple RF amplifiers according to the prior art.

Referring now to FIG. 11, a radio frequency (RF) amplifier circuit 150 according to the prior art is shown. The RF amplifier circuit 150 includes a three-phase rectifier circuit 152 that receives a 3-phase AC input voltage. The rectifier circuit 152 outputs an unregulated DC output voltage to a DC-DC converter 154. The DC-DC converter converts the unregulated DC output voltage to a regulated DC output voltage that is input to a DC-RF converter or RF power amplifier 156. While example values are shown in FIG. 11, skilled artisans will appreciate that other DC and AC voltage values may be used. Referring now to FIG. 12, a multiple amplifier circuit 160 includes three RF power amplifiers 160-1, 160-2 and 160-3 that output RF output signals to a 3-way combiner 170 that generates a combined RF output.

Figure 13:
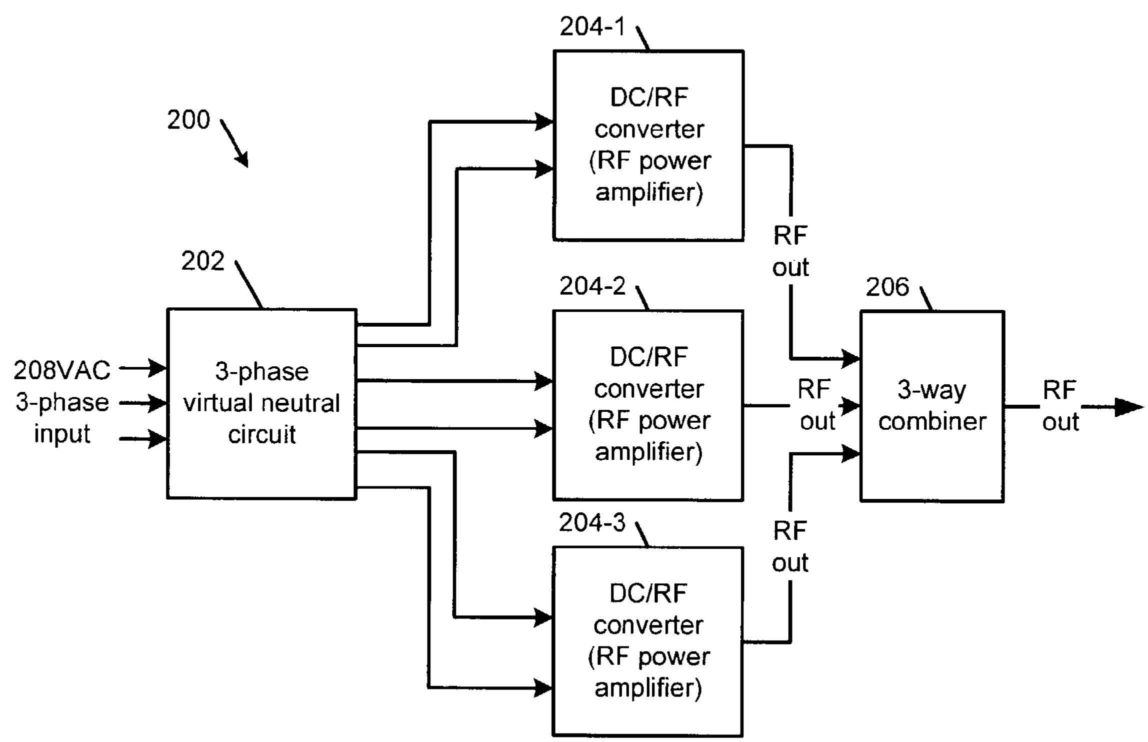
FIG. 13 is a functional block diagram of multiple RF amplifiers fed by a 3-phase virtual neutral circuit according to the present invention.

Referring now to FIG. 13, a multiple RF amplifier circuit 200 with the 3-phase virtual neutral circuit according to the present invention is shown. The multiple RF amplifier circuit 200 includes a 3-phase virtual neutral circuit 202, which receives a three phase AC input voltage and outputs three floating, regulated DC output voltages to RF power amplifiers 204-1, 204-2 and 204-3. RF outputs of the RF power amplifiers 204-1, 204-2 and 204-3 are input to a three-way combiner, which generates a combined RF output. The multiple RF amplifier circuit 200 according to the present invention eliminates the need for the DC-DC converter 154 in FIG. 12, which reduces cost and improves reliability.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A rectifier circuit for powering three power conversion modules using a three phase AC input without a neutral connection, said rectifier circuit comprising:

a first bridge rectifier that is connected to a first phase of said three phase AC input and that produces a first rectified waveform;

a second bridge rectifier that is connected to a second phase of said three phase AC input and that produces a second rectified waveform;

a third bridge rectifier that is connected to a third phase of said three phase AC input and that produces a third rectified waveform; and a first inductor having one end that is connected to said first bridge rectifier;

a second inductor having one end that is connected to said second bridge rectifier; and a third inductor having one end that is connected to said third bridge rectifier, wherein opposite ends of said first, second and third inductors are connected to form a virtual neutral.

2. The rectifier circuit of claim 1 further comprising:

a first capacitor that is connected across said first bridge rectifier that filters said first rectified waveform and that creates a first DC rail voltage;

a second capacitor that is connected across said second bridge rectifier that filters said second rectified waveform and that creates a second DC rail voltage; and a third capacitor that is connected across said third bridge rectifier that filters said third rectified waveform and that creates a third DC rail voltage.

3. The rectifier circuit of claim 2 wherein said first, second, and third DC rail voltages are of equal magnitude.

4. The rectifier circuit of claim 2 wherein said first DC rail voltage feeds a first power conversion module, said second DC rail voltage feeds a second power conversion module, and said third DC rail voltage feeds a third power conversion module.

5. The rectifier circuit of claim 4 wherein two of said first, second, and third power conversion modules remain powered at a decreased voltage level when the remaining one of said first, second, and third power conversion modules fails.

6. The rectifier circuit of claim 1 wherein said first, second, and third bridge rectifiers include:

first, second, third, and fourth diodes, each with an anode and a cathode, wherein said anode of said first diode is connected to said cathode of said second diode, said cathode of said first diode is connected to said cathode of said third diode, said anode of said second diode is connected to said anode of said fourth diode, said anode of said third diode is connected to said cathode of said fourth diode, said anode of said first diode of said first bridge rectifier is connected to said first phase of said three phase AC input, said anode of said first diode of said second bridge rectifier is connected to said second phase of said three phase AC input, and said anode of said first diode of said third bridge rectifier is connected to said third phase of said three phase AC input.

7. The rectifier circuit of claim 6 wherein said first inductor is connected to said anode of said third diode of said first bridge rectifier, said second inductor is connected to said anode of said third diode of said second bridge rectifier, and said third inductor is connected to said anode of said third diode of said third bridge rectifier.

8. The rectifier circuit of claim 1 further comprising:

a first resistor that is connected across said first bridge rectifier;

a second resistor that is connected across said second bridge rectifier; and a third resistor that is connected across said third bridge rectifier.

9. A rectifier circuit for powering three power conversion modules using a three phase AC input without a neutral connection, said rectifier circuit comprising:

a first bridge rectifier that is connected to a first phase of said three phase AC input and that produces a first rectified waveform;

a second bridge rectifier that is connected to a second phase of said three phase AC input and that produces a second rectified waveform;

a third bridge rectifier that is connected to a third phase of said three phase AC input and that produces a third rectified waveform;

a first inductor having one end that is connected to said first bridge rectifier;

a second inductor having one end that is connected to said second bridge rectifier;

a third inductor having one end that is connected to said third bridge rectifier, wherein opposite ends of said first, second and third inductors are connected to form a virtual neutral;

a first capacitor that is connected across said first bridge rectifier that filters said first rectified waveform and that creates a first DC rail voltage;

a second capacitor that is connected across said second bridge rectifier that filters said second rectified waveform and that creates a second DC rail voltage; and a third capacitor that is connected across said third bridge rectifier that filters said third rectified waveform and that creates a third DC rail voltage.

10. The rectifier circuit of claim 9 wherein said first DC rail voltage feeds a first power conversion module, said second DC rail voltage feeds a second power conversion module, and said third DC rail voltage feeds a third power conversion module.

11. The rectifier circuit of claim 10 wherein two of said first, second, and third power conversion modules remain powered at a decreased voltage level when the remaining one of said first, second, and third power conversion modules fails.

12. The rectifier circuit of claim 10 wherein said first, second, and third bridge rectifiers include:

first, second, third, and fourth diodes, each with an anode and a cathode, said anode of said first diode is connected to said cathode of said second diode, said cathode of said first diode is connected to said cathode of said third diode, said anode of said second diode is connected to said anode of said fourth diode, said anode of said third diode is connected to said cathode of said fourth diode, said anode of said first diode of said first bridge rectifier is connected to said first phase of said three phase AC input, said anode of said first diode of said second bridge rectifier is connected to said second phase of said three phase AC input, and said anode of said first diode of said third bridge rectifier is connected to said third phase of said three phase AC input.

13. The rectifier circuit of claim 12 wherein said first inductor is connected to said anode of said third diode of said first bridge rectifier, said second inductor is connected to said anode of said third diode of said second bridge rectifier, and said third inductor is connected to said anode of said third diode of said third bridge rectifier.

14. The rectifier circuit of claim 9 further comprising:

a first resistor that is connected across said first bridge rectifier;

a second resistor that is connected across said second bridge rectifier; and a third resistor that is connected across said third bridge rectifier.

* * * * *